US012651860B2

(12) United States Patent
Chen et al.

(10) Patent No.: US 12,651,860 B2
(45) Date of Patent: Jun. 9, 2026

(54) COMBINED ELECTRICAL CONNECTOR WITH JOINING COMPONENT HAVING A JOINING BRIDGING CONDUCTIVE METAL

(71) Applicant: Tarng Yu Enterprise co., ltd., New Taipei City (TW)

(72) Inventors: Ying-Chung Chen, New Taipei City (TW); Mu-Jung Huang, New Taipei City (TW)

(73) Assignee: TARNG YU ENTERPRISE CO., LTD., New Taipei City (TW)

( * ) Notice: Subject to any disclaimer, the term of this patent is extended or adjusted under 35 U.S.C. 154(b) by 397 days.

(21) Appl. No.: 18/518,875

(22) Filed: Nov. 24, 2023

(65) Prior Publication Data

US 2024/0178603 A1 May 30, 2024

(30) Foreign Application Priority Data

Nov. 25, 2022 (TW) ................................. 111145334

(51) Int. Cl.
*H01R 13/424* (2006.01)

(52) U.S. Cl.
CPC .................................. *H01R 13/424* (2013.01)

(58) Field of Classification Search
CPC ......................... H01R 13/424; H01R 13/6585; H01R 13/502; H01R 13/518; H01R 13/6597
USPC ............................................................ 439/79
See application file for complete search history.

(56) References Cited

U.S. PATENT DOCUMENTS

| | | | | |
|---|---|---|---|---|
| 9,972,945 B1 * | 5/2018 | Huang | H01R 13/6585 | |
| 11,411,355 B2 * | 8/2022 | Lv | H01R 13/506 | |
| 11,605,922 B2 * | 3/2023 | Chen | H01R 13/516 | |
| 12,080,963 B1 * | 9/2024 | Chen | H01R 11/01 | |
| 12,322,901 B2 * | 6/2025 | Guo | H01R 13/6275 | |
| 12,451,653 B2 * | 10/2025 | Guo | H01R 13/6335 | |
| 2020/0076135 A1 * | 3/2020 | Tang | H01R 12/721 | |
| 2021/0234291 A1 * | 7/2021 | Zerebilov | H01R 13/502 | |
| 2021/0242616 A1 * | 8/2021 | Omodachi | H01R 12/7005 | |
| 2021/0313721 A1 * | 10/2021 | Little | H01R 13/6272 | |
| 2023/0208060 A1 * | 6/2023 | Chen | H01R 12/716 | 439/62 |
| 2023/0208068 A1 * | 6/2023 | Chen | H01R 13/64 | 439/527 |
| 2023/0238746 A1 * | 7/2023 | Liu | H01R 13/6596 | 439/607.05 |
| 2024/0178598 A1 * | 5/2024 | Chen | H01R 12/716 | |
| 2025/0023266 A1 * | 1/2025 | Cheng | H01R 13/6471 | |
| 2025/0253592 A1 * | 8/2025 | Chen | H01R 13/6585 | |
| 2025/0379384 A1 * | 12/2025 | Han | H01R 12/91 | |

* cited by examiner

*Primary Examiner* — Harshad C Patel
(74) *Attorney, Agent, or Firm* — LANWAY IPR SERVICES; Chun-Ming Shih

(57) ABSTRACT

A type of combined electrical connector is at least made by combining an outer shell component and a joining component. The joining component at least consists of a joining major conductive terminal assembly and a joining minor conductive terminal assembly. Therefore, after the electrical connector design is completed, customization of the quantity, structure, and electrical connection relationships of the conductive terminals can still be achieved by adjusting the outer shell component and the joining component to meet the specific requirements and advancements in electronic devices.

13 Claims, 19 Drawing Sheets

A-A

B-B

COMBINED ELECTRICAL CONNECTOR WITH JOINING COMPONENT HAVING A JOINING BRIDGING CONDUCTIVE METAL

CROSS-REFERENCE TO RELATED APPLICATIONS

This application claims the priority of Republic of China Patent Application No. 111145334 filed on Nov. 25, 2022, in the State Intellectual Property Office of the R.O.C., the disclosure of which is incorporated herein by reference.

BACKGROUND OF THE INVENTION

Field of the Invention

This application is related to the field of electronic device technology, more specifically, it relates to a combined electrical connector that allows for the customization of the number, structure, and electrical connections of conductive terminals.

Descriptions of the Related Art

In various modern electronic devices, electrical connectors are typically employed to provide signal transmission. However, to meet the specific requirements and advancements in electronic devices, there is a demand for the customization of the number and structure of the conductive terminals in electrical connectors. Presently, once the design of an electrical connector is finalized, the number, the structure, and the electrical connections of conductive terminals become fixed and cannot be customized. This limitation makes it challenging to fulfill the signal transmission needs of electronic devices, ultimately restricting the technological (functional) development of electronic devices Furthermore, there might be a need for certain conductive terminals on an electrical connector to be electrically connected to each other. Currently, in the industry, the only solution for achieving electrical connections between certain conductive terminals on an electrical connector is to add jumper adaptors that are compatible with the connector. However, adding these jumper adaptors occupies the internal space of electronic devices, which, in turn, hinders the ongoing trend of making electronic devices smaller and more compact.

Given this situation, customizing the number and structure of the conductive terminals on an electrical connector has become a pressing technical challenge that the industry is eager to overcome.

SUMMARY OF THE INVENTION

In view of the drawbacks of the prior art mentioned above, the present application provides a combined electrical connector, which is used with a joining element, comprising: an outer shell component including an outer shell joining structure, and the outer shell joining structure can join to the joining element; a joining component including a joining base, a joining insulation terminal frame, a joining bridging conductive metal, a joining major conductive terminal assembly, and a joining minor conductive terminal assembly; wherein the joining base includes a joining base plugging structure and a joining base crimping structure; the joining major conductive terminal assembly includes a plurality of the joining major bridging conductive terminals and a joining major non-bridging conductive terminal, and the joining minor conductive terminal assembly includes a plurality of the joining minor bridging conductive terminals and a joining minor non-bridging conductive terminal; the joining bridging conductive metal includes a joining conductive metal major abutting structure and a joining conductive metal minor abutting structure; the joining insulation terminal frame includes a joining insulation terminal frame major connection structure and a joining insulation terminal frame minor connection structure, and the joining insulation terminal frame major connection structure and the joining insulation terminal frame minor connection structure are respectively connected to one side of the joining major conductive terminal assembly and the joining minor conductive terminal assembly, to respectively provide positioning for the joining major conductive terminal assembly and the joining minor conductive terminal assembly; wherein the joining base, the joining insulation terminal frame, the joining bridging conductive metal, the joining major conductive terminal assembly, and the joining minor conductive terminal assembly are assembled to form a joining component combination, in the joining component combination, the joining base plugging structure is inserted into the joining insulation terminal frame, and the joining base crimping structure is crimped onto the joining bridging conductive metal, thereby positioning the joining bridging conductive metal on the joining insulation terminal frame via the joining base, and the joining bridging conductive metal extends across the joining major non-bridging conductive terminal and the joining minor non-bridging conductive terminal, allowing the joining conductive metal major abutting structure to abut each of the joining major bridging conductive terminals, thereby electrically connecting each of the joining major bridging conductive terminals, and allowing the joining conductive metal minor abutting structure to abut each of the joining minor bridging conductive terminals, thereby electrically connecting each of the joining minor bridging conductive terminals; and the joining component is embedded within the outer shell component to form an electrical connector combination, in the electrical connector combination, the contact areas of the joining major conductive terminal assembly and the joining minor conductive terminal assembly are exposed on the outer shell joining structure, allowing the contact areas of the joining major conductive terminal assembly and the joining minor conductive terminal assembly to make electrical contact with the joining element when it the outer shell joining structure is joined to the joining element.

Preferably, the combined electrical connector said above, wherein joining base plugging structure is further inserted into the joining bridging conductive metal to provide positioning for the joining bridging conductive metal.

Preferably, the combined electrical connector said above, wherein the joining insulation terminal frame further includes a joining insulation terminal frame connection structure, in the electrical connector combination, the joining insulation terminal frame connection structure is used to connect the outer shell component by means of snapping, fastening, or interference.

Preferably, the combined electrical connector said above, wherein the joining insulation terminal frame comprises a joining insulation terminal frame major element and a joining insulation terminal frame minor element, and the joining insulation terminal frame major connection structure is positioned on the joining insulation terminal frame major element, while the joining insulation terminal frame minor connection structure is positioned on the joining insulation terminal frame minor element, wherein the joining insulation terminal frame major element further includes a joining insulation terminal frame major assembly structure, and the joining insulation terminal frame minor element includes a joining insulation terminal frame minor assembly structure, wherein the joining insulation terminal frame major assembly structure and the joining insulation terminal frame minor assembly structure are structurally coordinated, allowing the joining insulation terminal frame major element and the joining insulation terminal frame minor element to combine and form a joining insulation terminal frame combination.

Preferably, the combined electrical connector said above, wherein the joining base further includes a joining base assembly structure, and the joining base assembly structure is respectively structurally coordinated with the joining insulation terminal frame major assembly structure and the joining insulation terminal frame minor assembly structure, allowing the joining base assembly structure is combined with the joining insulation terminal frame major element and the joining insulation terminal frame minor element to form the joining insulation terminal frame combination.

Preferably, the combined electrical connector said above, wherein the joining bridging conductive metal further includes a joining conductive metal assembly structure, and the joining base assembly structure is structurally coordinated with the joining conductive metal assembly structure, allowing the joining base assembly structure to combine with the joining bridging conductive metal, the joining insulation terminal frame major element, and the joining insulation terminal frame minor element to form the joining insulation terminal frame combination.

Preferably, the combined electrical connector said above, the joining base assembly structure, the joining conductive metal assembly structure, the joining insulation terminal frame major assembly structure, and the joining insulation terminal frame minor assembly structure are protrusion and recess structure which are structurally coordinated.

Preferably, the combined electrical connector said above, wherein the joining base plugging structure includes a joining base plugging major substructure and a joining base plugging minor substructure, and the joining base plugging major substructure and the joining base plugging minor substructure are crossed arrangement and respectively insert into the joining insulation terminal frame major element and the joining insulation terminal frame minor element.

Preferably, the combined electrical connector said above, wherein the joining base includes a joining base separating wall, in the joining component combination, the joining base separating wall separates the joining major conductive terminal assembly from the joining minor conductive terminal assembly.

Preferably, the combined electrical connector said above, wherein the joining bridging conductive metal comprises a joining conductive metal major bridging element and a joining conductive metal minor bridging element, and the joining conductive metal major abutting structure and the joining conductive metal minor abutting structure are separately positioned on the joining conductive metal major bridging element and the joining conductive metal minor bridging element, wherein the joining base plugging structure is separately inserted into the joining conductive metal major bridging element and the joining conductive metal minor bridging element, respectively providing positioning for each of the joining conductive metal major bridging elements and the joining conductive metal minor bridging element.

Preferably, the combined electrical connector said above, wherein the joining bridging conductive metal further comprises a joining conductive metal attaching structure, and the joining conductive metal attaching structure electrically attaches the joining conductive metal major bridging element and the joining conductive metal minor bridging element separately, allowing each of the joining major bridging conductive terminals and each of the joining minor bridging conductive terminals to be electrically connected.

Preferably, the combined electrical connector said above, wherein the joining base is insulation base or conductive plastic base.

Preferably, the combined electrical connector said above, wherein the outer shell joining structure is an embedding structure, and the contact areas of the joining major conductive terminal assembly and the joining minor conductive terminal assembly are exposed on the side wall surface of the embedding structure.

In comparison to prior art, the combined electrical connector provided in this application is at least composed of an outer shell component and a joining component. The joining component at least comprises a joining base, a joining insulation terminal frame, a joining bridging conductive metal, a joining major conductive terminal assembly, and a joining minor conductive terminal assembly. Therefore, after the electrical connector design is completed, it is still possible to achieve customization of the quantity, structure, and electrical connection relationships of the conductive terminals of the electrical connector by adjusting the outer shell component and the joining component to meet to the specific requirements and advancements in electronic devices.

Additionally, the joining bridging conductive metal can achieve electrical connection among the conductive terminals of the electrical connector, reducing signal crosstalk among the conductive terminals of the electrical connector to enhance the transmission speed and quality of signal in the electrical connector. Furthermore, the present application eliminates the need for additional jumper adaptors to achieve electrical connection among the conductive terminals of the electrical connector, allowing electronic devices equipped with the combined electrical connector disclosed herein to continue progressing towards being lightweight, compact, and small in size.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
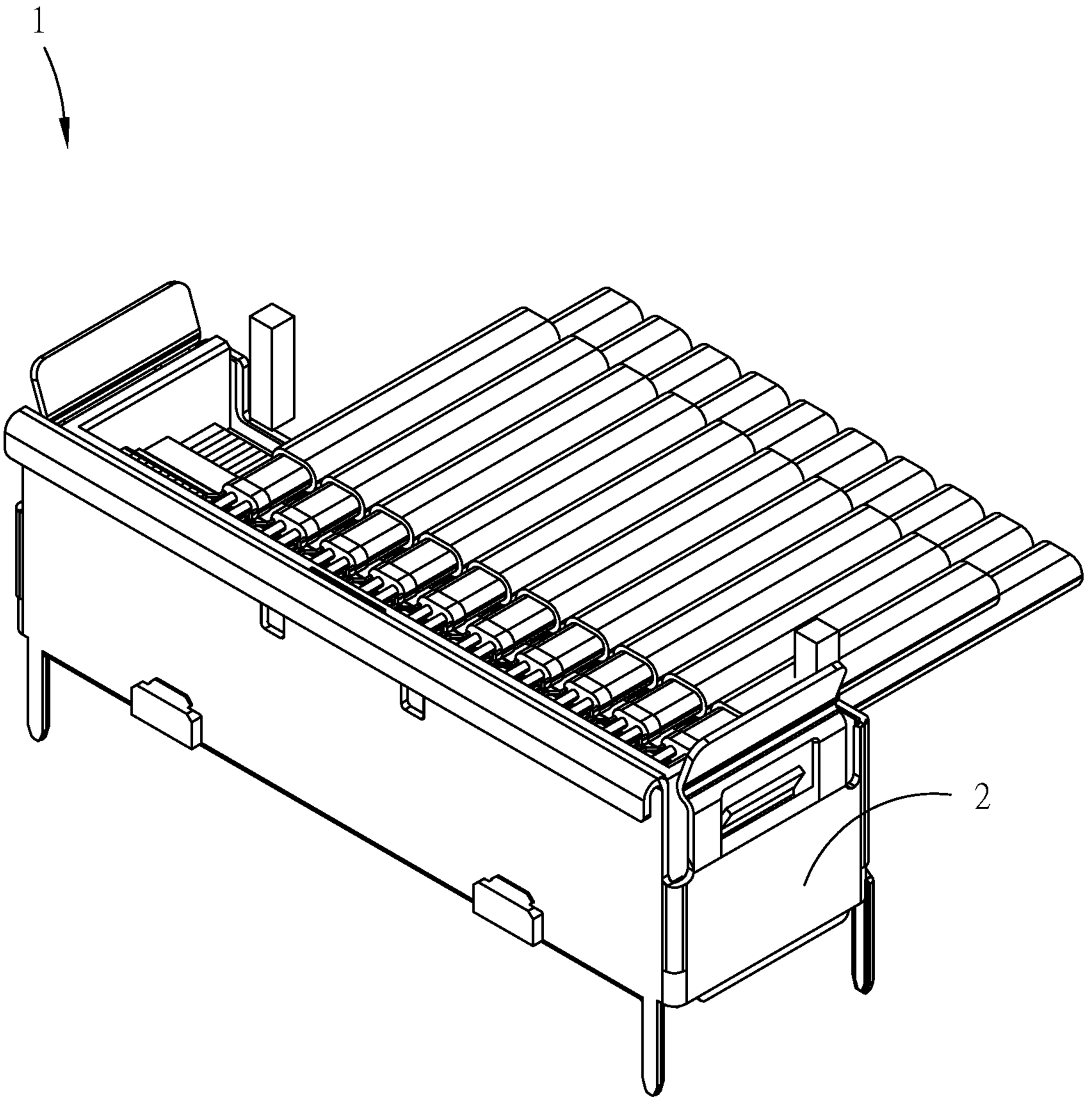
FIG. 1 is a three-dimensional schematic diagram of the embodiment of the combined electrical connector in the present application.
Figure 2:
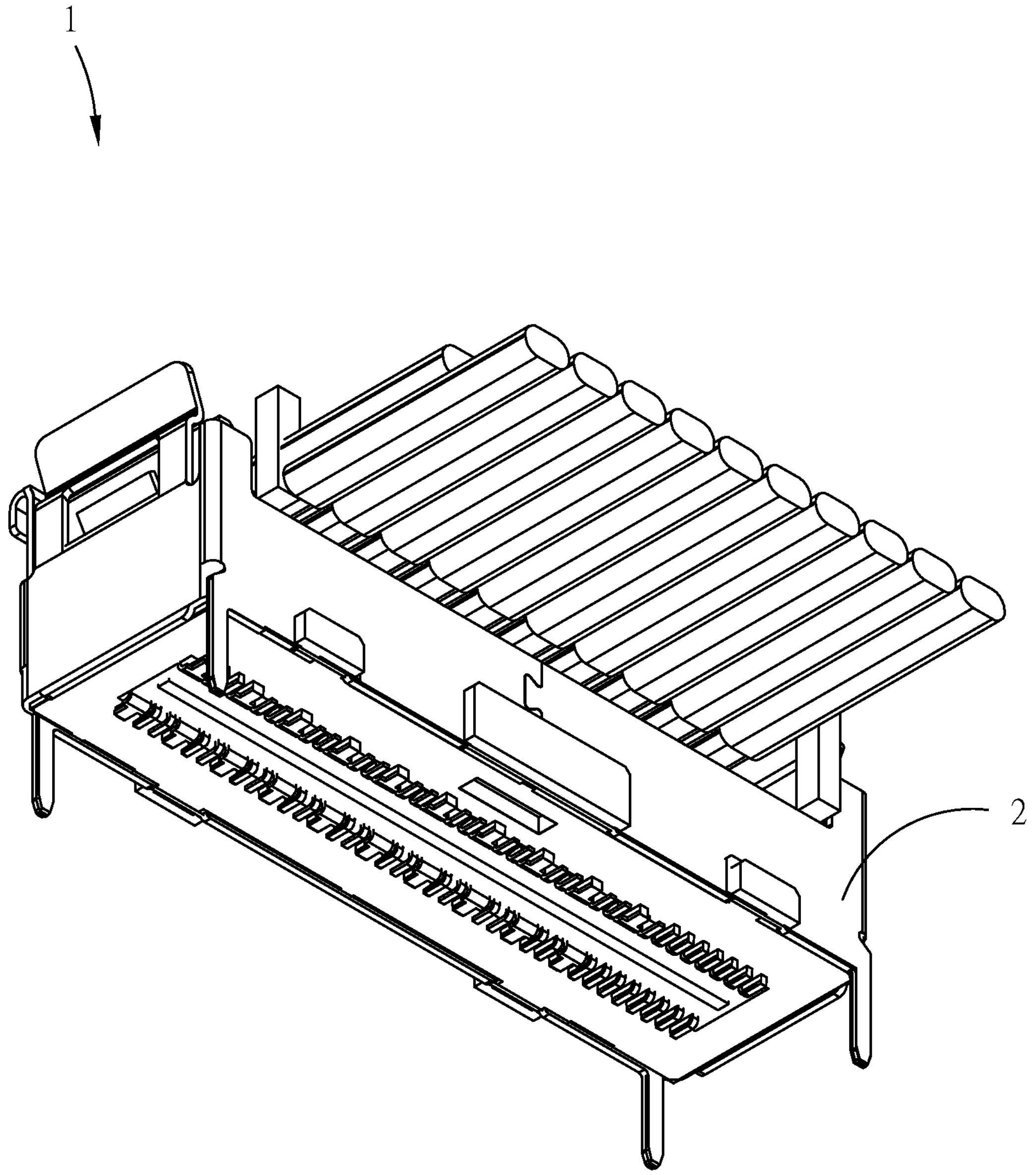
FIG. 2 is a three-dimensional schematic diagram of the embodiment of the combined electrical connector in the present application.
Figure 3:
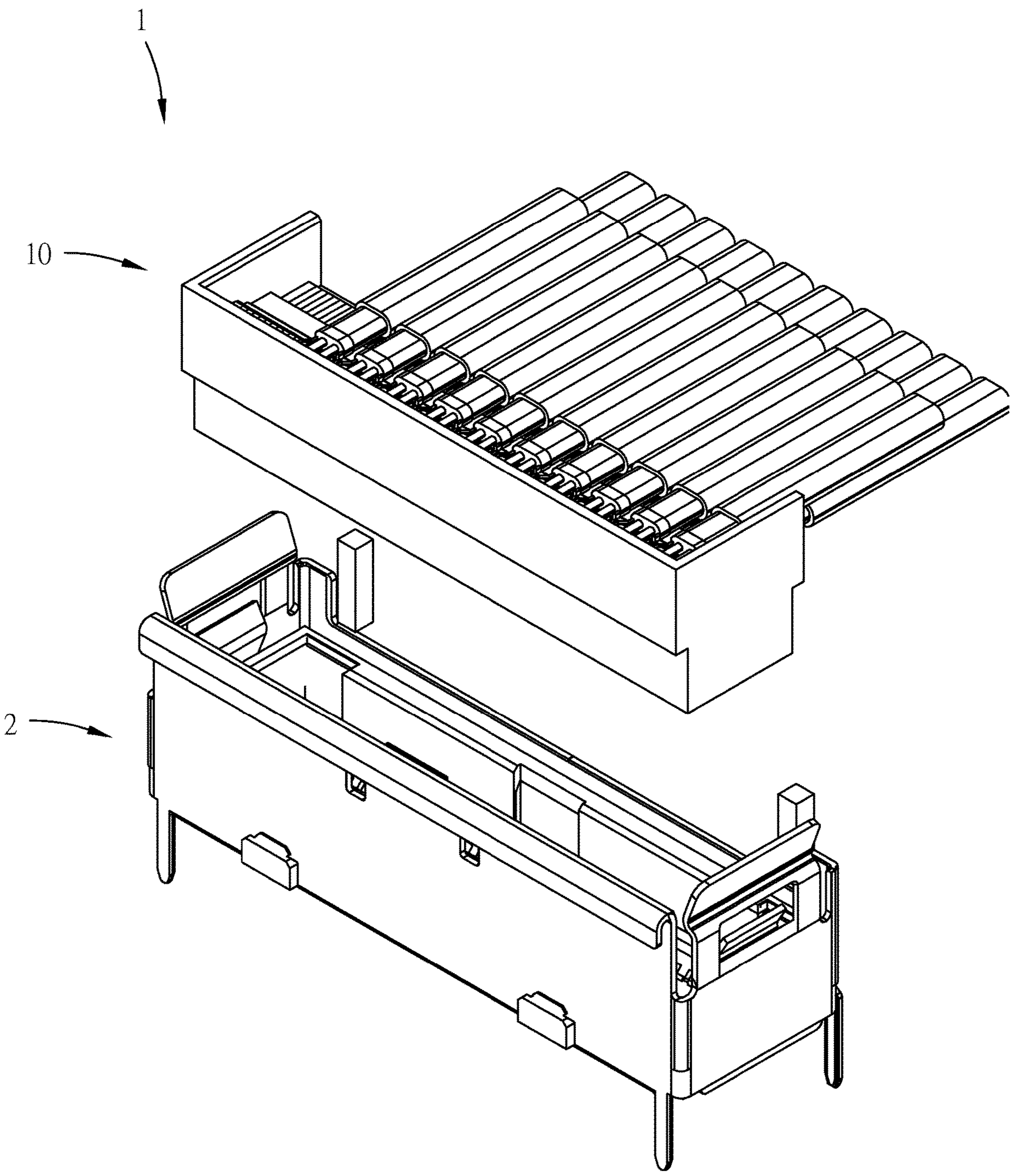
FIG. 3 is a three-dimensional schematic diagram of some components of an embodiment of the combined electrical connector according to the present application.
Figure 4:
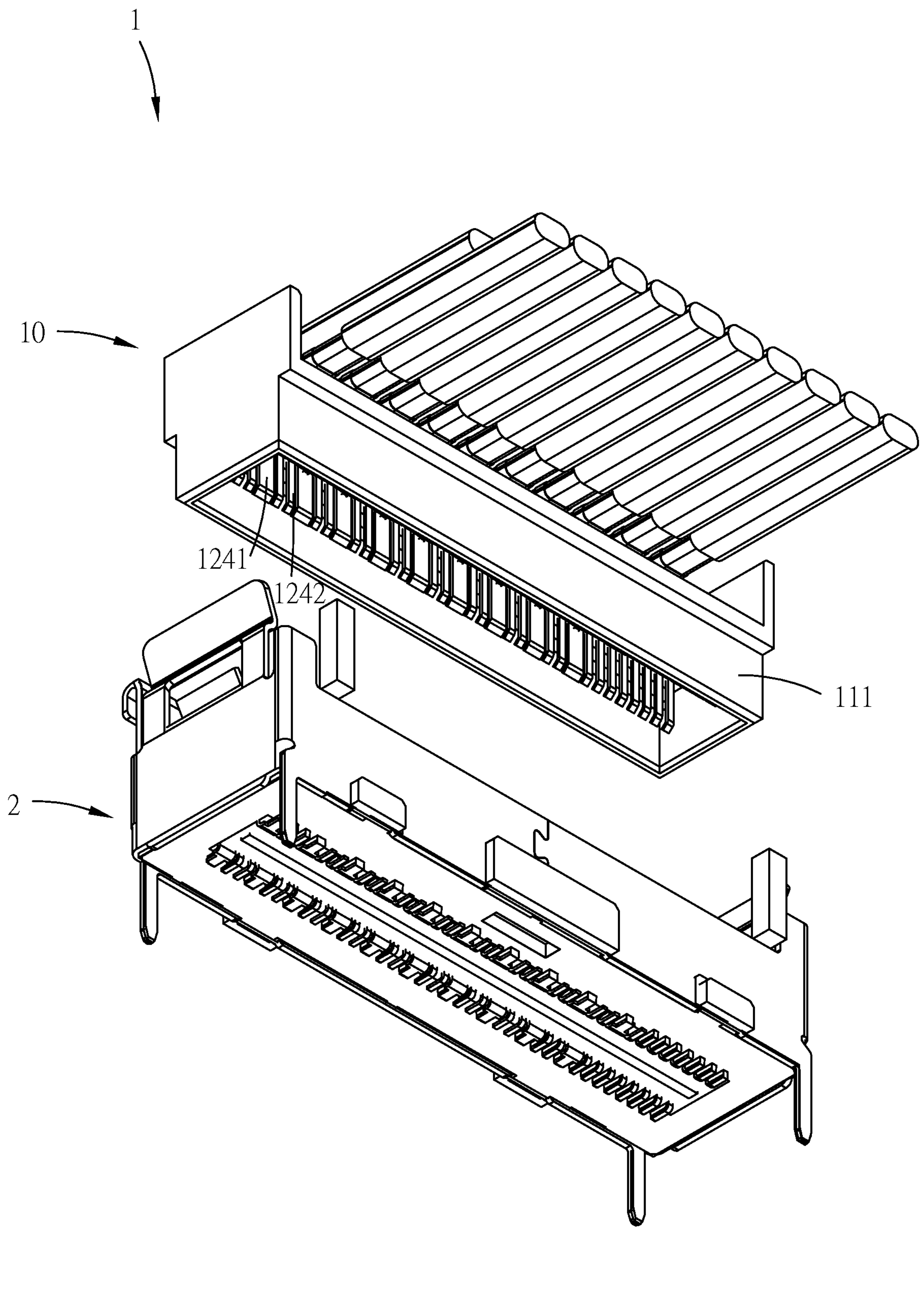
FIG. 4 is a three-dimensional schematic diagram of some components of an embodiment of the combined electrical connector according to the present application.
Figure 5:
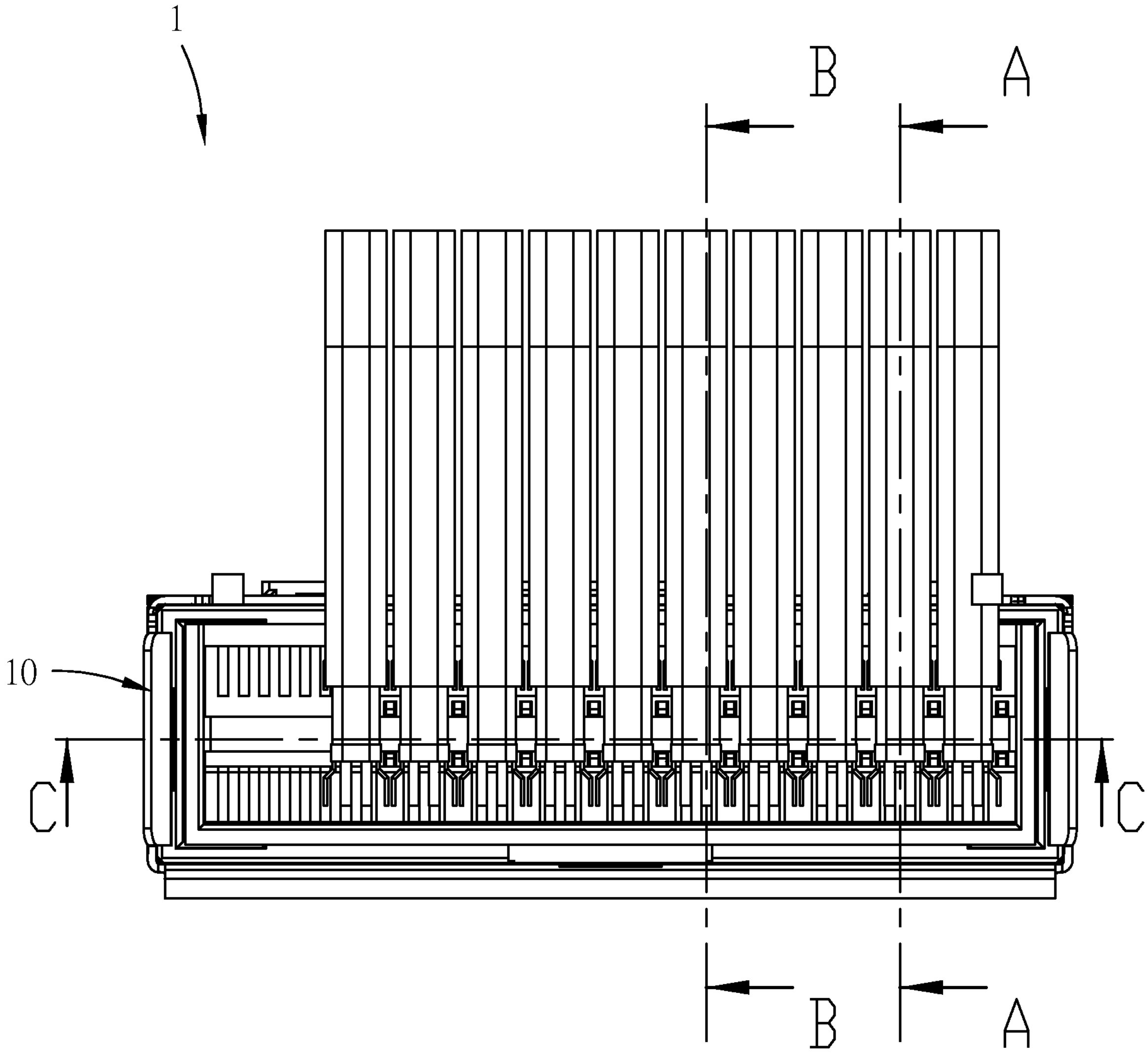
FIG. 5 is a top view schematic diagram of some components of an embodiment of the combined electrical connector according to the present application.
Figure 6:
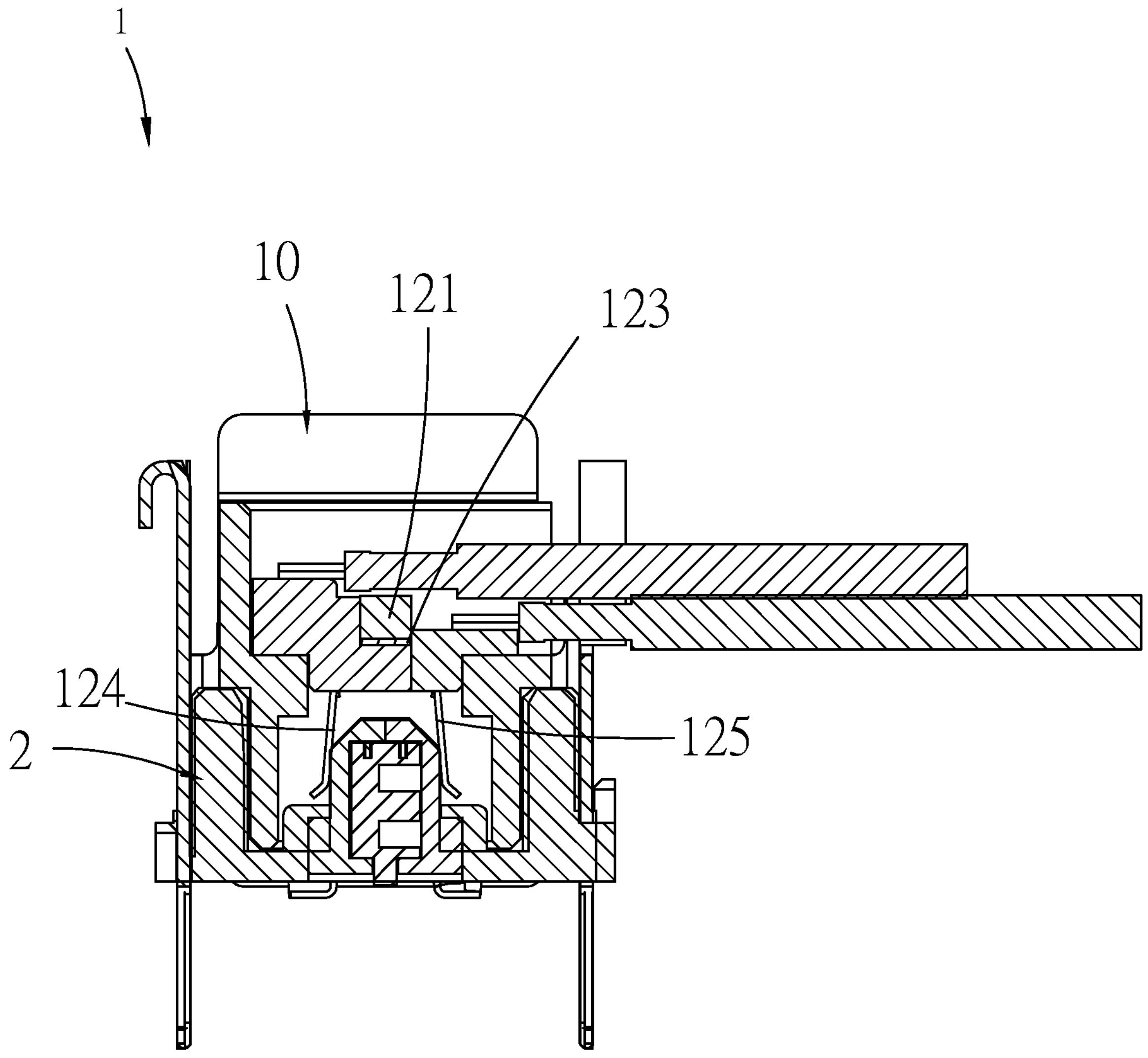
FIG. 6 is a sectional schematic diagram of some components of the combined electrical connector shown in FIG. 5 cut along the line AA.
Figure 7:
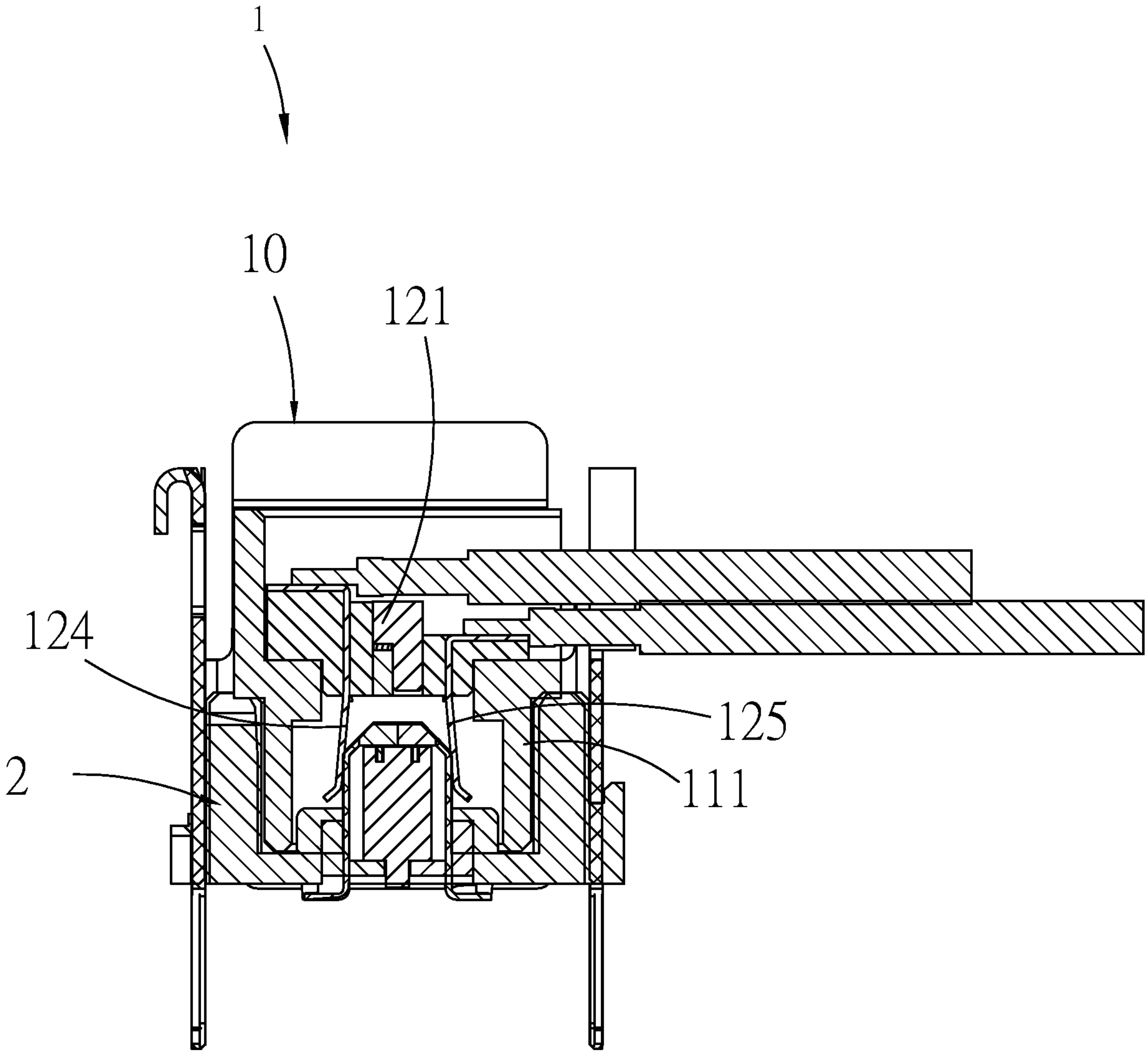
FIG. 7 is a sectional schematic diagram of some components of the combined electrical connector shown in FIG. 5 cut along the line BB.
Figure 8:
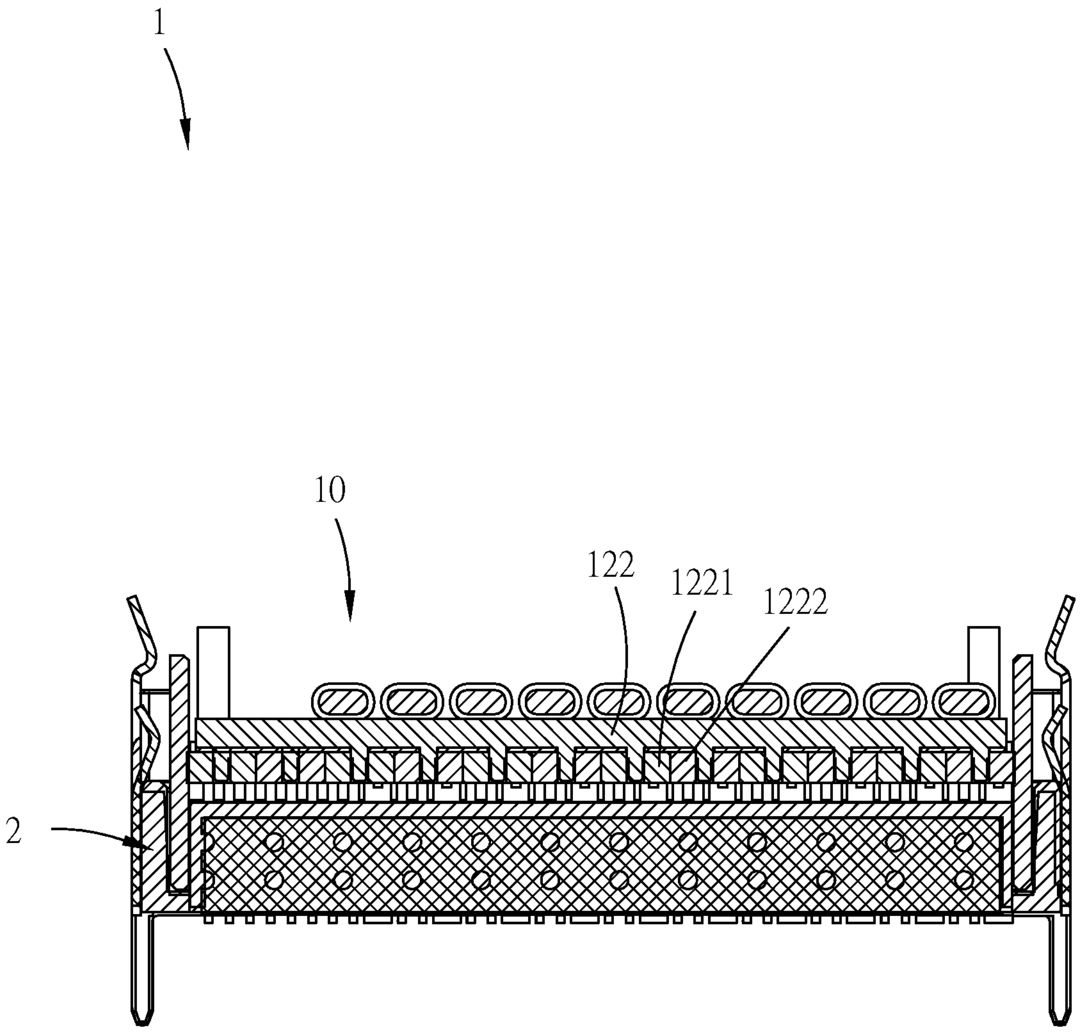
FIG. 8 is a sectional schematic diagram of some components of the combined electrical connector shown in FIG. 5 cut along the line CC.
Figure 9:
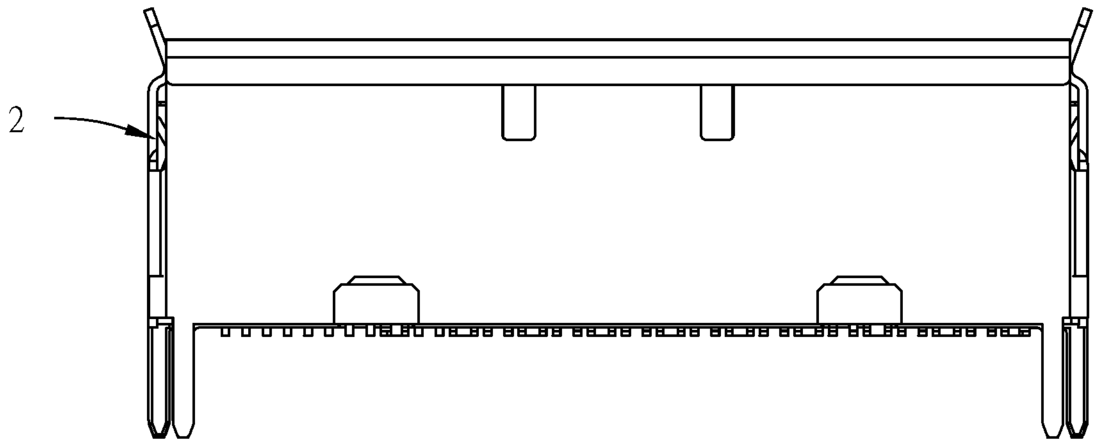
FIG. 9 is a front view schematic diagram of some components of an embodiment of the combined electrical connector according to the present application.
Figure 10:
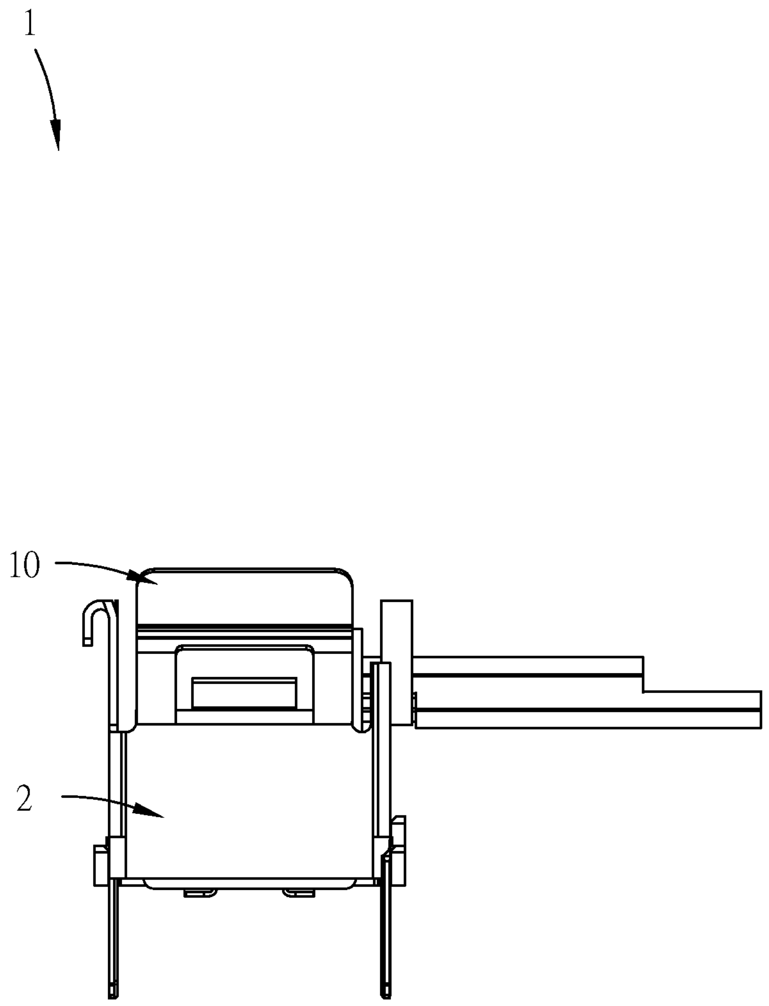
FIG. 10 is a side view schematic diagram of some components of an embodiment of the combined electrical connector according to the present application.
Figure 11:
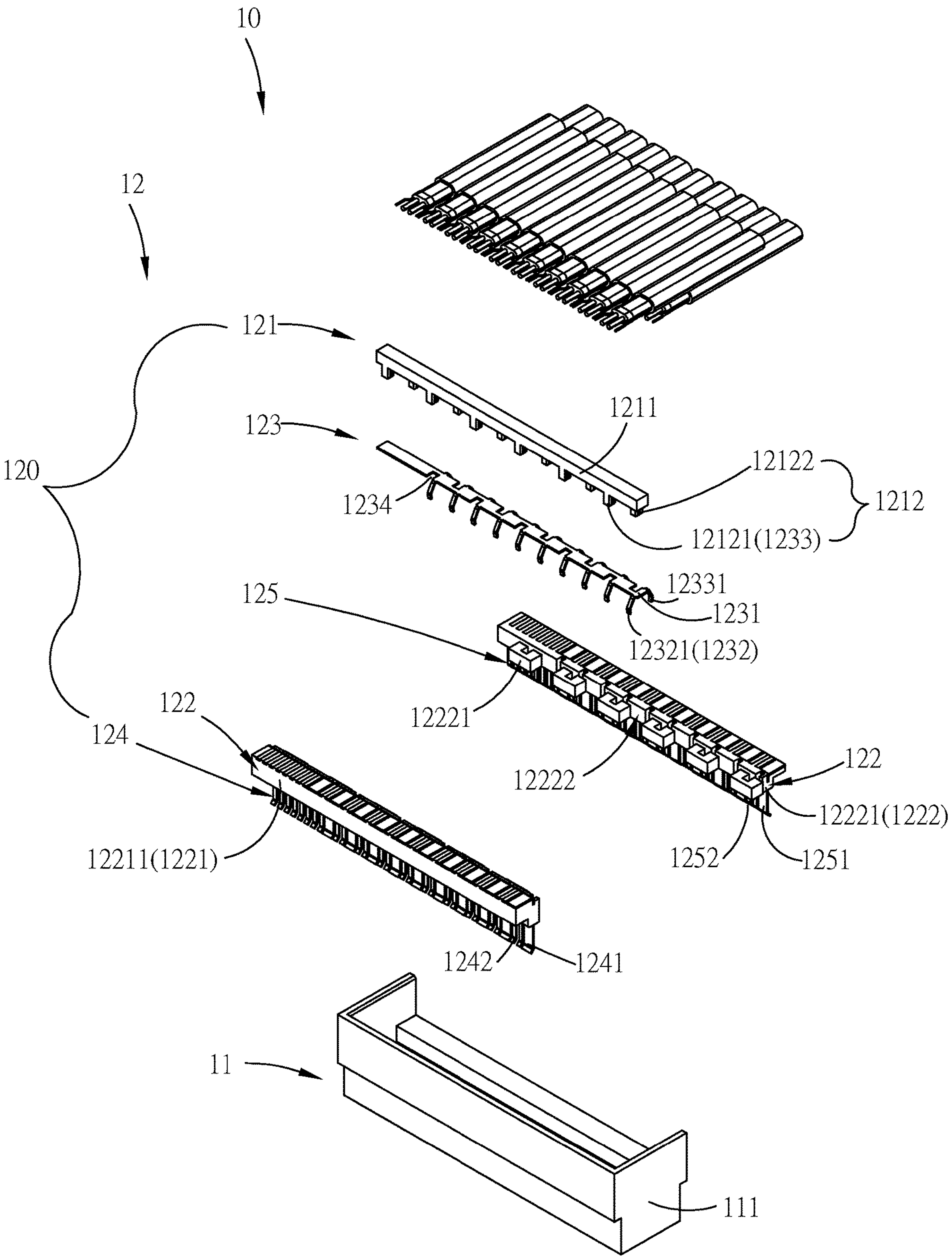
FIG. 11 is a three-dimensional schematic diagram of some components of an embodiment of the combined electrical connector according to the present application.
Figure 12:
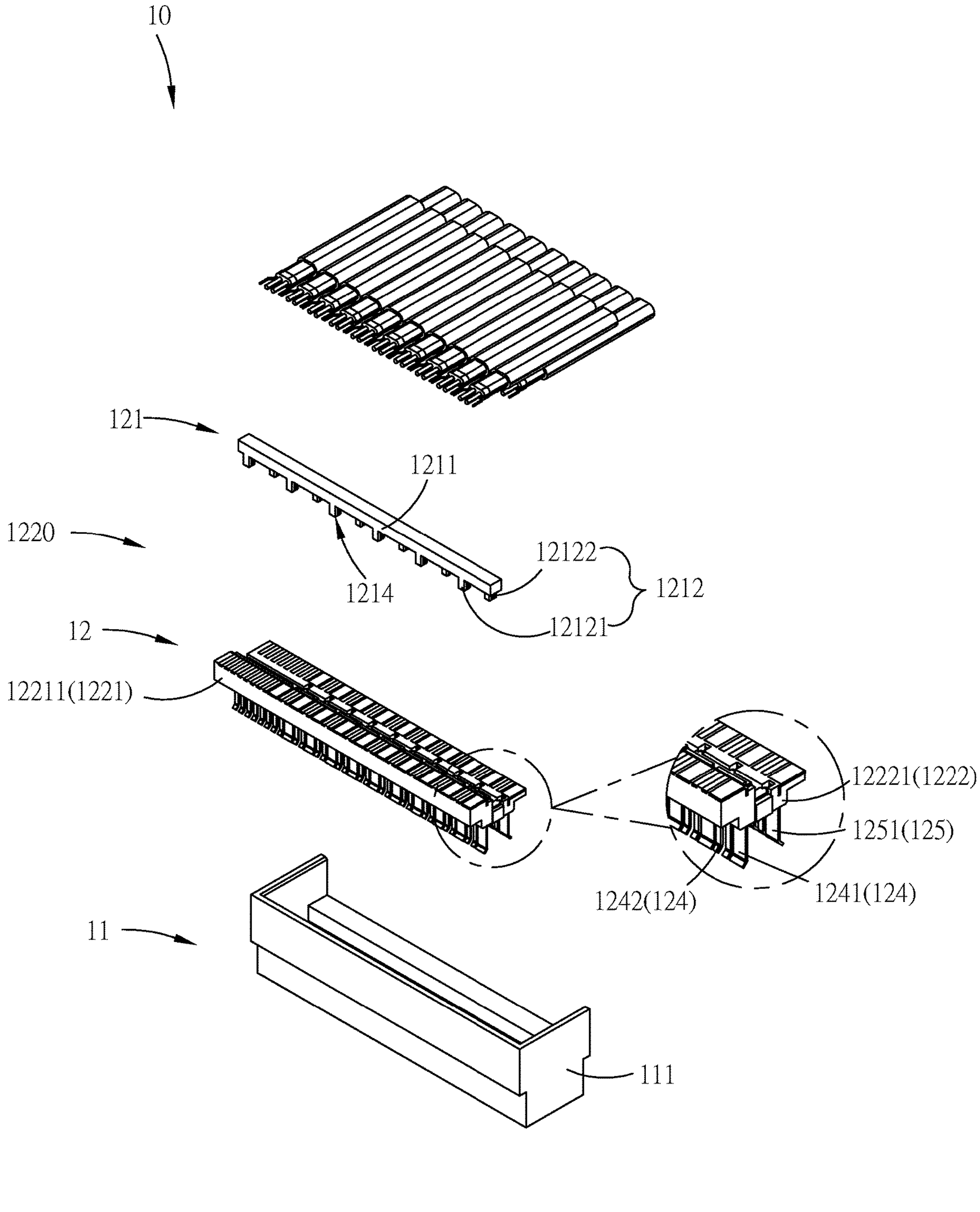
FIG. 12 is a three-dimensional schematic diagram of some components of an embodiment of the combined electrical connector according to the present application.
Figure 13:
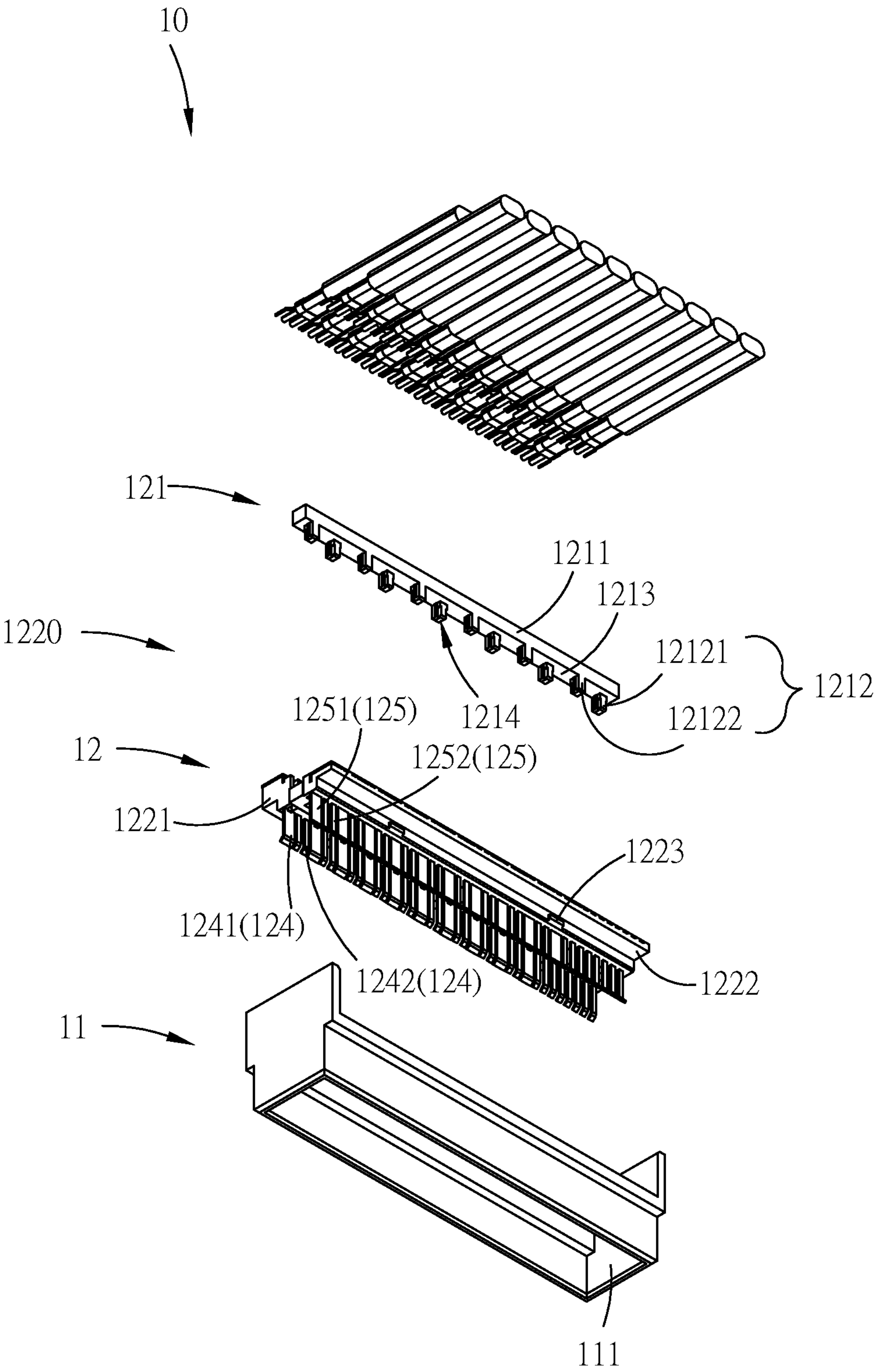
FIG. 13 is a three-dimensional schematic diagram of some components of an embodiment of the combined electrical connector according to the present application.
Figure 14:
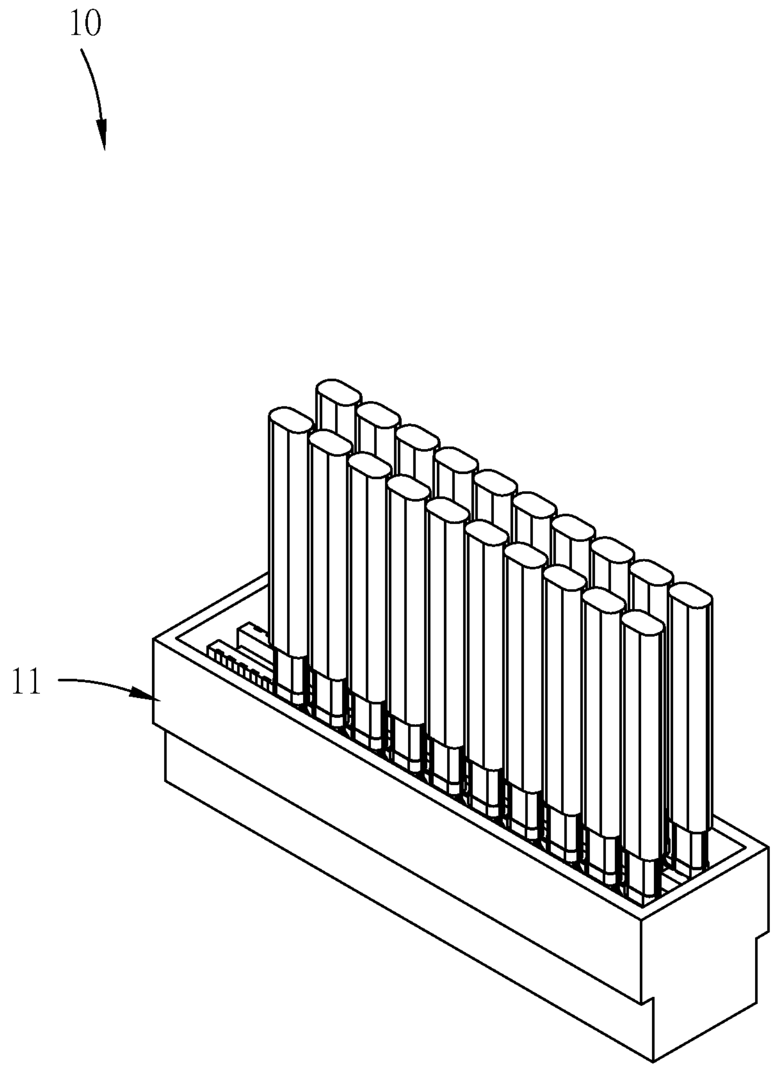
FIG. 14 is a three-dimensional schematic diagram of the embodiment of the electrical connector combination in the present application.
Figure 15:
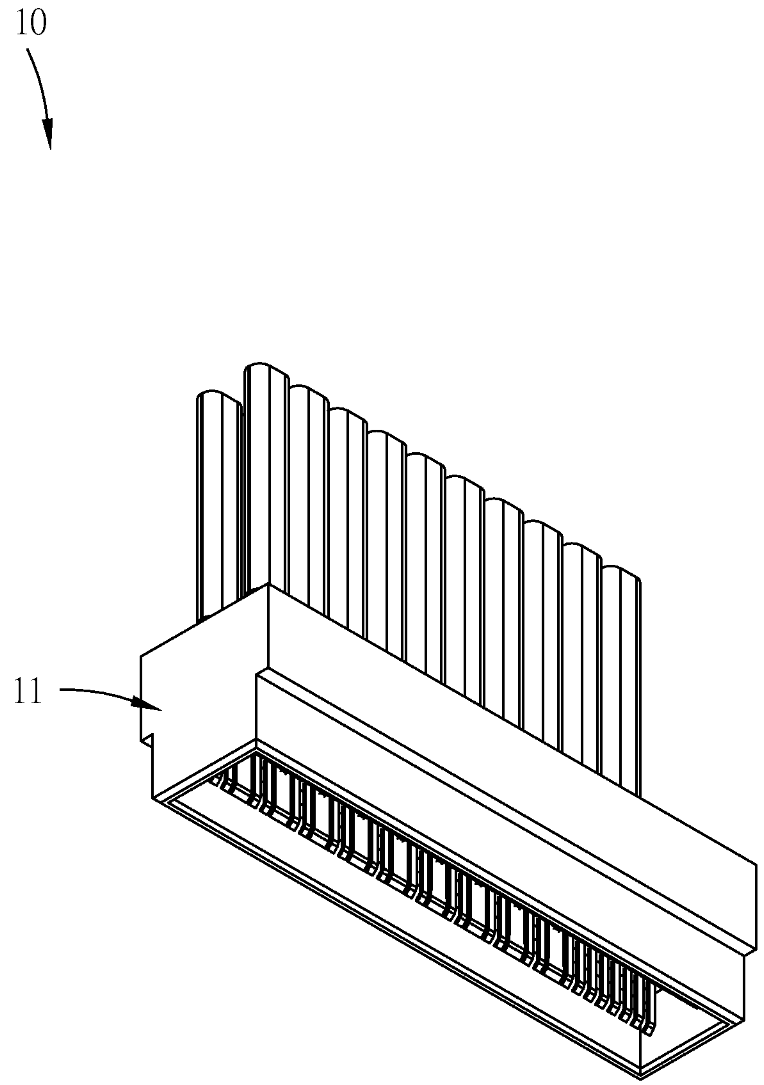
FIG. 15 is a three-dimensional schematic diagram of the embodiment of the electrical connector combination in the present application.
Figure 16:
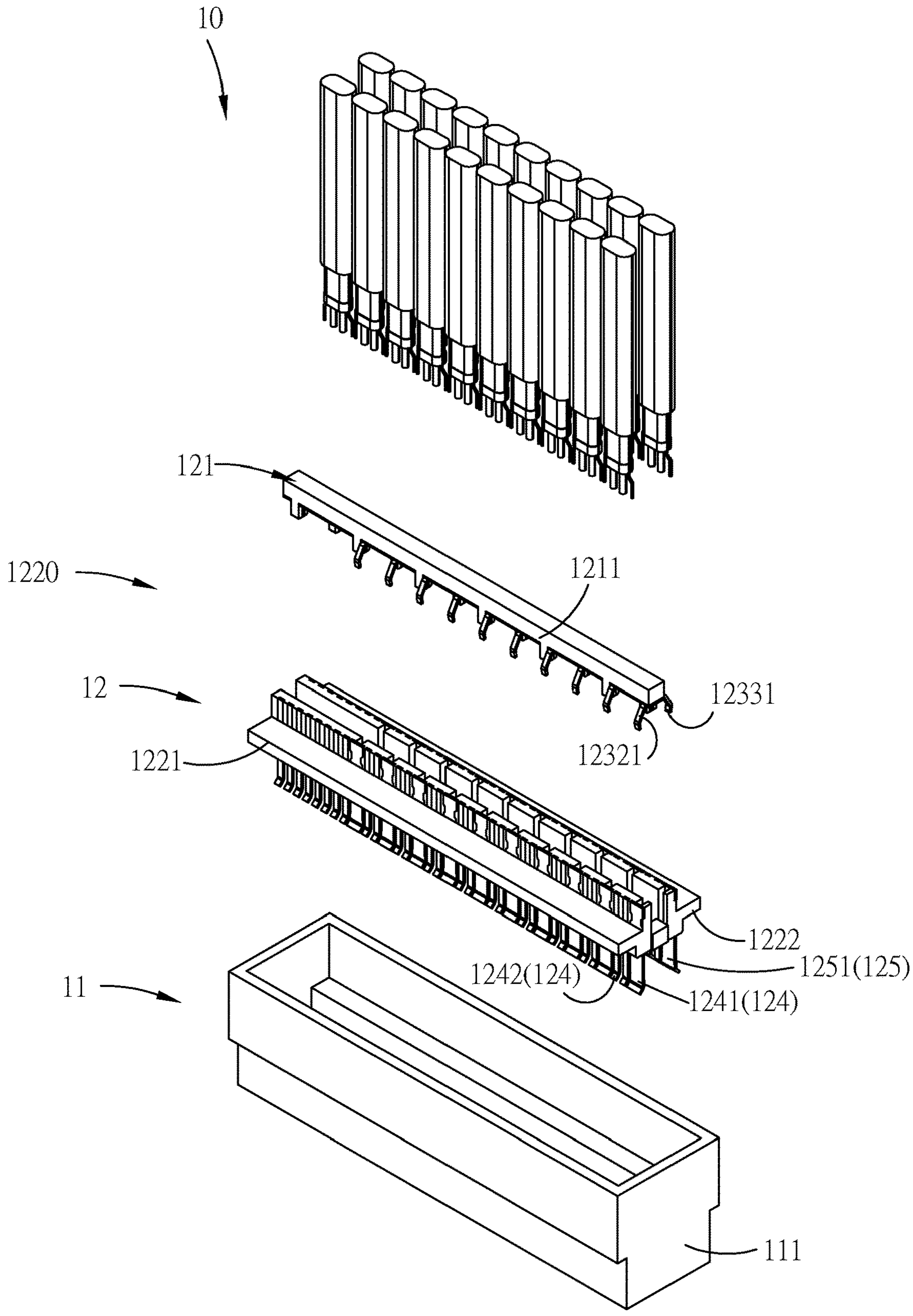
FIG. 16 is a three-dimensional schematic diagram of some components of an embodiment of the combined electrical connector according to the present application.
Figure 17:
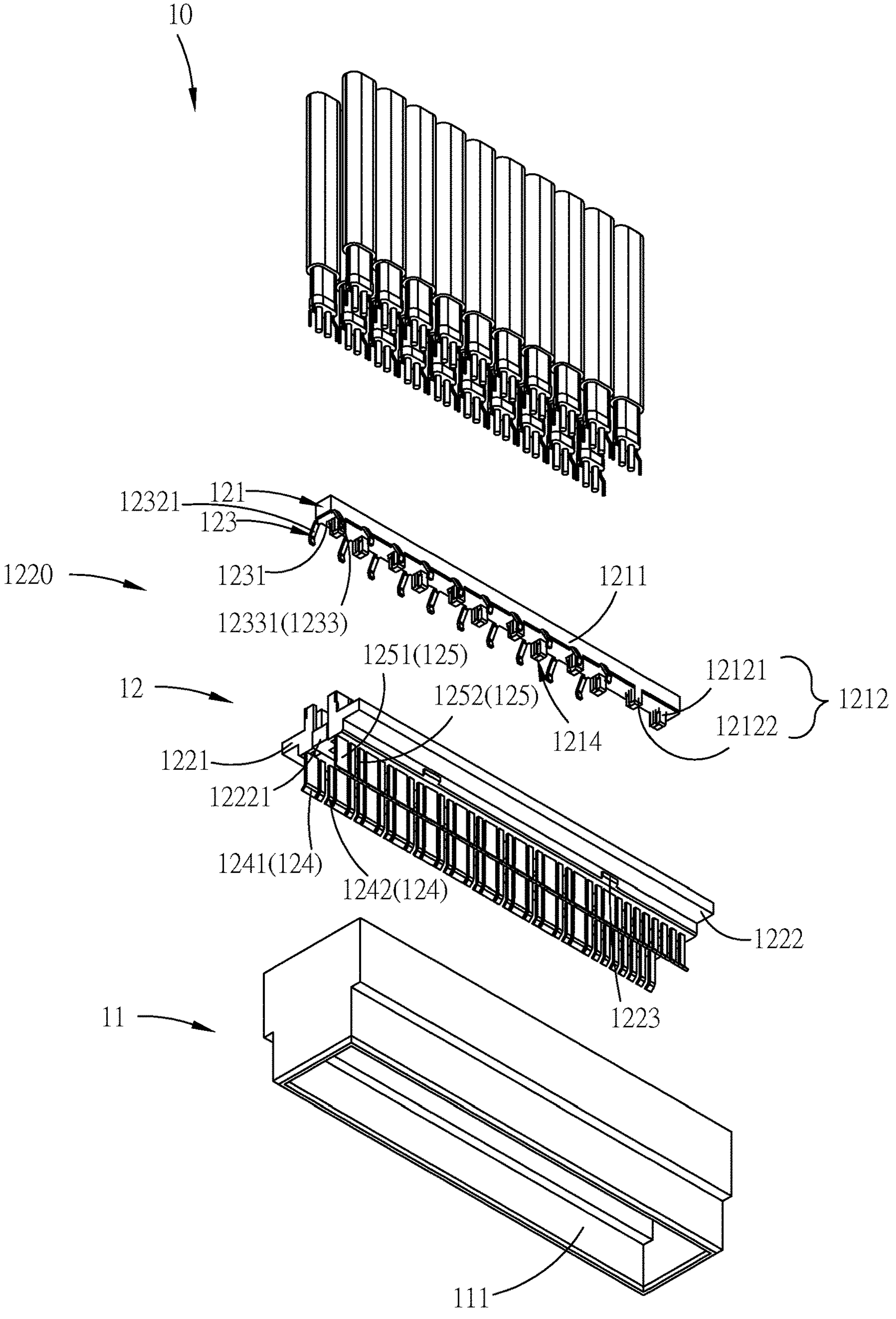
FIG. 17 is a three-dimensional schematic diagram of some components of an embodiment of the combined electrical connector according to the present application.
Figure 18:
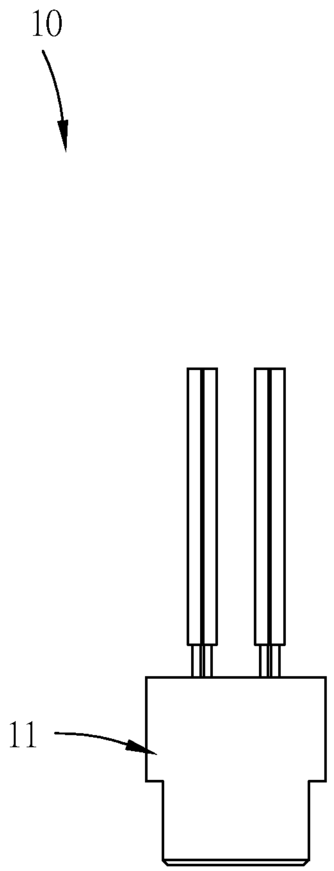
FIG. 18 is a side view schematic diagram of some components of an embodiment of the electrical connector combination according to the present application.
Figure 19:
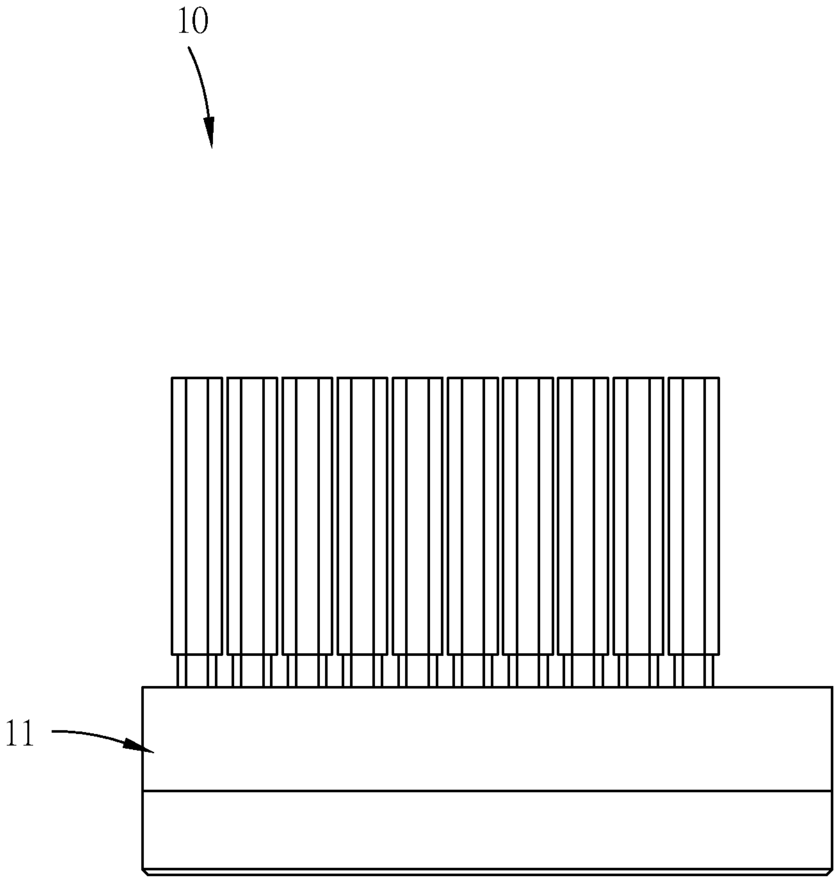
FIG. 19 is a front view schematic diagram of some components of an embodiment of the electrical connector combination according to the present application.

For a detailed description of the embodiments disclosed in the present application, please refer to FIGS. 1 to 19.

This application provides a combined electrical connector equipped with a joining element, shown in embodiments from FIGS. 1 to 19, designed to transmit signal. In these embodiments, the combined electrical connector 1 serves as a wire-end electrical connector for joining wires to facilitate signal transmission, while the joining element 2 serves as a board-end electrical connector installed on a circuit board to support signal transmission. The combined electrical connector 1 comprises an outer shell component 11 and a joining component 12. The outer shell component 11, made of insulating material, is provided to position for the joining component 12, and the outer shell component 11 includes an outer shell joining structure 111 to be provided to join with the joining element 2. The joining component 12 is provided to be equipped with a joining element 2 to provide signal transmission.

In the embodiment said above, the joining component 12 comprises a joining base 121, a joining insulation terminal frame 122, a joining bridging conductive metal 123, a joining major conductive terminal assembly 124, and a joining minor conductive terminal assembly 125. The joining major conductive terminal assembly 124 and the joining minor conductive terminal assembly 125 are capable of facilitating the transmission of signal such as differential signal or ground signal. The joining major conductive terminal assembly 124 includes a plurality of joining major bridging conductive terminals 1241 and joining major non-bridging conductive terminals 1242. The joining minor conductive terminal assembly 125 includes a plurality of joining minor bridging conductive terminals 1251 and joining minor non-bridging conductive terminals 1252.

It should be noted that in the embodiment said above, the outer shell joining structure 111 is an embedding structure, and the joining portions of the joining major conductive terminal assembly 124 and the joining minor conductive terminal assembly 125 are exposed on the side wall of the embedding structure to facilitate joining with the joining element 2.

It should be noted that the joining major bridging conductive terminals 1241 and the joining minor bridging conductive terminals 1251 can be provided to transmit the ground signal. In the embodiment said above, the quantity of the joining major bridging conductive terminals 1241 and the joining minor bridging conductive terminals 1251 is specified as multiple, but the quantity of the joining major bridging conductive terminals 1241 and the joining minor bridging conductive terminals 1251 is not limited to multiple; the quantity of the joining major bridging conductive terminals 1241 and the joining minor bridging conductive terminals 1251 could also be a single. Additionally, in the above embodiment, the quantity of the joining major non-bridging conductive terminal 1242 and the joining minor non-bridging conductive terminal 1252 is specified as one, but the quantity of the joining major non-bridging conductive terminal 1242 and the joining minor non-bridging conductive terminal 1252 is not limited to one; the quantity of the joining major non-bridging conductive terminal 1242 and the joining minor non-bridging conductive terminal 1252 could also be multiple.

In the embodiment said above, the joining bridging conductive metal 123 has a joining conductive metal attaching structure 1231, a joining conductive metal major abutting structure 12321, and a joining conductive metal minor abutting structure 12331. The joining conductive metal attaching structure 1231, the joining conductive metal major abutting structure 12321, and the joining conductive metal minor abutting structure 12331 can be integrally formed as a single unit by punching a metal sheet, ensuring the structural strength of the joining bridging conductive metal 123 meets expectations.

It should be noted that in the embodiment said above, the joining conductive metal attaching structure 1231, the joining conductive metal major abutting structure 12321, and the joining conductive metal minor abutting structure 12331 are formed integrally as a single unit, but not limited to this. The joining conductive metal attaching structure 1231, the joining conductive metal major abutting structure 12321, and the joining conductive metal minor abutting structure 12331 can be formed as separate components. In other words, the joining bridging conductive metal 123 can be composed by assembling multiple components.

In the embodiment said above, the joining insulation terminal frame 122 is made of the insulation materials and comprises a joining insulation terminal frame major element 1221 and a joining insulation terminal frame minor element 1222. The joining insulation terminal frame major element 1221 includes a joining insulation terminal frame major connection structure 12211 and a joining insulation terminal frame major assembly structure 12212. The joining insulation terminal frame minor element 1222 includes a joining insulation terminal frame minor connection structure 12221 and a joining insulation terminal frame minor assembly structure 12222.

It should be noted that in the embodiment said above, the joining insulation terminal frame major element 1221 and the joining insulation terminal frame minor element 1222 are different element, but not limited to this, the joining insulation terminal frame major element 1221 and the joining insulation terminal frame minor element 1222 can be designed to be formed a single unit.

In the embodiment said above, the joining insulation terminal frame major connection structure 12211 and the joining insulation terminal frame minor connection structure 12221 are respectively joined with one side of the joining major conductive terminal assembly 124 and the joining minor conductive terminal assembly 125 to position the joining major conductive terminal assembly 124 and the joining minor conductive terminal assembly 125 on the joining insulation terminal frame major element 1221 and the joining insulation terminal frame minor element 1222, allowing the joining major conductive terminal assembly 124 and the joining minor conductive terminal assembly 125 to form a cantilever structure. This cantilever structure enables the electrical interconnection of the joining major conductive terminal assembly 124 and the joining minor conductive terminal assembly 125 with the joining element, ensuring that the electrical characteristics of the combined electrical connector 1 meet expectations.

The joining insulation terminal frame major assembly structure 12212 and the joining insulation terminal frame minor assembly structure 12222 are structurally coordinated, allowing the joining insulation terminal frame major element 1221 and the joining insulation terminal frame minor element 1222 to be combined into a single unit to form the joining insulation terminal frame combination 1220. Correspondingly, the joining base 121 has a joining base assembly structure 1214, and the joining bridging conductive metal 123 has a joining conductive metal assembly structure 1234. The joining base assembly structure 1214 is structurally coordinated with the joining conductive metal assembly structure 1234, the joining insulation terminal frame major assembly structure 12212, and the joining insulation terminal frame minor assembly structure 12222, allowing the joining base assembly structure 1214 to combine with the joining bridging conductive metal 123, the joining insulation terminal frame major element 1221, and the joining insulation terminal frame minor element 1222 to form the joining insulation terminal frame combination 1220.

It should be noted that in the embodiment said above, the joining base assembly structure 1214 and the joining conductive metal assembly structure 1234 as well as the joining insulation terminal frame major assembly structure 12212 and the joining insulation terminal frame minor assembly structure 12222 form a complementary protrusion and recess structure which are structurally coordinated to reduce the thickness dimension of the joining insulation terminal frame combination 1220, thereby decreasing the size of the combined electrical connector 1 in this application. This reduction in size enables electronic devices using the combined electrical connector 1 in this application to continue progressing towards being lightweight, compact, and small.

Additionally, the joining base 121 has a joining base separating wall 1211, a joining base plugging structure 1212, and a joining base crimping structure 1213. The joining base 121, the joining insulation terminal frame major element 1221, the joining insulation terminal frame minor element 1222, the joining bridging conductive metal 123, the joining major conductive terminal assembly 124, and the joining minor conductive terminal assembly 125 are combined to form the joining component combination 120. In this joining component combination 120, the joining base separating wall 1211 separates the joining major conductive terminal assembly 124 from the joining minor conductive terminal assembly 125, the joining base plugging structure 1212 plugs into the joining insulation terminal frame 122, and the joining base crimping structure 1213 crimps onto the joining bridging conductive metal 123. Through the joining base 121, the joining bridging conductive metal 123 is positioned on the joining insulation terminal frame 122, wherein the joining bridging conductive metal 123 extends over the joining major non-bridging conductive terminal 1242 and the joining minor non-bridging conductive terminal 1252, enabling the joining conductive metal major abutting structure 12321 to abut each of the joining major bridging conductive terminals 1241, electrically connecting the joining major bridging conductive terminal 1241 to form a bridging circuit providing transmission of ground signal. The joining conductive metal minor abutting structure 12331 abuts each of the joining minor bridging conductive terminals 1251, electrically connecting the joining minor bridging conductive terminal 1251 to form a bridging circuit providing transmission of ground signal.

In the embodiment said above, additionally, the joining base 121 can be a conductive plastic base, thereby reducing signal crosstalk between the joining major conductive terminal assembly 124 and the joining minor conductive terminal assembly 125, optimizing the transmission speed and quality of the electrical connector for specific requirements and developments in electronic devices. However, this is not limited to it; the joining base 121 can also be an insulating base, providing support to the joining bridging conductive metal 123 via the insulating base.

In the present application, the joining base plugging structure 1212 is inserted into the joining bridging conductive metal 123, providing positioning for the joining bridging conductive metal 123. In the embodiment said above, the joining base plugging structure 1212 comprises a joining base plugging major substructure 12121 and a joining base plugging minor substructure 12122. The joining base plugging major substructure 12121 and the joining base plugging minor substructure 12122 are arranged in an interleaved manner and are respectively inserted into the joining insulation terminal frame major element 1221 and the joining insulation terminal frame minor element 1222, respectively providing positioning for both the joining insulation terminal frame major element 1221 and the joining insulation terminal frame minor element 1222, allowing the joining insulation terminal frame major element 1221 and the joining insulation terminal frame minor element 1222 to combine and form the joining insulation terminal frame combination 1220.

In the embodiment said above, the joining bridging conductive metal 123 includes a joining conductive metal major bridging element 1232 and a joining conductive metal minor bridging element 1233. The joining conductive metal major abutting structure 12321 and the joining conductive metal minor abutting structure 12331 are respectively positioned on the joining conductive metal major bridging element 1232 and the joining conductive metal minor bridging element 1233. The joining base plugging structure 1212 is inserted into the joining conductive metal major bridging element 1232 and the joining conductive metal minor bridging element 1233, respectively providing positioning for both the joining conductive metal major bridging element 1232 and the joining conductive metal minor bridging element 1233.

In the joining component combination 120, the joining conductive metal attaching structure 1231 is respectively electrically connected with the joining conductive metal major bridging element 1232 and the joining conductive metal minor bridging element 1233, enabling the electrical connection of each of the joining major bridging conductive terminals 1241 and each of the joining minor bridging conductive terminals 1251, forming a bridging circuit capable of transmitting ground signal.

It should be noted that, the combined electrical connector 1 of this present application can achieve the electrical connection between the certain conductive terminals on the electrical connector without the need for additional jumper adaptors, allowing the electronic devices using the combined electrical connector 1 of this present application to continue evolving towards more lightweight and compact. Additionally, the bridging circuit can provide a transmission ground signal, further reducing signal crosstalk between the certain conductive terminals on the electrical connector to enhance the transmission speed and quality of signals, meeting the specific requirements and development trends of electronic devices.

It should be noted that in the embodiment said above, the joining component combination 120 is made of the coordination of the joining base 121, the joining insulation terminal frame 122, the joining bridging conductive metal 123, the joining major conductive terminal assembly 124, and the joining minor conductive terminal assembly 125. Therefore, after the electrical connector design is completed, customization and adjustment of the quantity, structure, and electrical connection relationship of the conductive terminals of the electrical connector can still be achieved by respectively adjusting the joining base 121, the joining insulation terminal frame 122, the joining bridging conductive metal 123, the joining major conductive terminal assembly 124, and the joining minor conductive terminal assembly 125, allowing meeting the specific requirements and developments of electronic devices.

In the embodiment said above, the joining conductive metal major abutting structure 12321 is designed as a cantilever structure, allowing the joining bridging conductive metal 123 to flexibly abut each of the joining major bridging conductive terminals 1241, resulting in an improved effect of each of the joining major bridging conductive terminals 1241 on the joining conductive metal major abutting structure 12321. Similarly, the joining conductive metal minor abutting structure 12331 is designed as a cantilever structure, enabling the joining bridging conductive metal 123 to flexibly abut each of the joining minor bridging conductive terminals 1251, resulting in an improved effect of each of the joining minor bridging conductive terminals 1251 on the joining conductive metal minor abutting structure 12331.

In the embodiment said above, the joining component 12 is embedded in the outer shell component 11 to form an electrical connector combination 10. It should be noted that in the electrical connector combination 10, the joining portion of the joining major conductive terminal assembly 124 and the joining minor conductive terminal assembly 125 is exposed on the outer shell joining structure 111. When the outer shell component 11 is joining with the joining element 2, the joining portion of the joining major conductive terminal assembly 124 and the joining minor conductive terminal assembly 125 electrically joins the joining element 2 to provide signal transmission.

In the embodiment said above, the joining insulation terminal frame 122 has a joining insulation terminal frame connection structure 1223. In the electrical connector combination 10, the joining insulation terminal frame connection structure 1223 is designed to join with the outer shell component 11 using a snapping method, a fastening method, or an interference method, allowing the joining insulation terminal frame 122 to be joined with the outer shell component 11 to form a single unit. Therefore, the joining insulation terminal frame connection structure 1223 is a snapping structure, fastening structure, or interference structure.

It should be noted that in the above embodiments, certain components may be omitted. For example, in this application, the combined electrical connector includes an outer shell component and a tongue component. The joining component includes a joining base, a joining insulation terminal frame, a joining bridging conductive metal, a joining major conductive terminal assembly, and a joining minor conductive terminal assembly. The joining base includes a joining base plugging structure and a joining base crimping structure. The joining major conductive terminal assembly includes a plurality of joining major bridging conductive terminals and joining major non-bridging conductive terminals, and the joining minor conductive terminal assembly includes a plurality of joining minor bridging conductive terminals and joining minor non-bridging conductive terminals. The joining bridging conductive metal includes a joining conductive metal major abutting structure and a joining conductive metal minor abutting structure. The joining insulation terminal frame includes a joining insulation terminal frame major joining structure and a joining insulation terminal frame minor joining structure, and the joining insulation terminal frame major joining structure and the joining insulation terminal frame minor joining structure are respectively joined with one side of the joining major conductive terminal assembly and the joining minor conductive terminal assembly, respectively providing positioning for the joining major conductive terminal assembly and the joining minor conductive terminal assembly. The joining base, the joining insulation terminal frame, the joining bridging conductive metal, the joining major conductive terminal assembly and the joining minor conductive terminal assembly are assembled to form a joining component combination. In the joining component combination, the joining base plugging structure is inserted into the insulation terminal frame, and the joining base crimping structure crimps onto the joining bridging conductive metal. Through the joining bridging conductive metal positioned on the joining insulation terminal frame, the joining bridging conductive metal extends over the joining major non-bridging conductive terminal and the joining minor non-bridging conductive terminal, allowing the joining conductive metal major abutting structure to abut each of the joining major bridging conductive terminals, enabling each of the joining major bridging conductive terminals to be electrically connected, allowing the joining conductive metal minor abutting structure abuts each of the joining minor bridging conductive terminals, enabling each of the joining minor bridging conductive terminals to be electrically connected. The joining component is embedded in the outer shell component to form the electrical connector combination. In the electrical connector combination, the joining portion of the joining major conductive terminal assembly and the joining minor conductive terminal assembly are exposed on the outer shell joining structure. When the outer shell joining structure joins with the joining element, the joining portion of the joining major conductive terminal assembly and the joining minor conductive terminal assembly electrically joins with the joining component.

In summary, the combined electrical connector provided in this application is at least composed of an outer shell component and a joining component. The tongue component is at least composed of a joining base, a joining insulation terminal frame, a joining bridging conductive metal, a joining major conductive terminal assembly, and a joining minor conductive terminal assembly. Therefore, even after the electrical connector design is completed, customization of the quantity, structure, and electrical connection relationship of the conductive terminals can still be achieved through adjustments to the outer shell component and the joining component to enable the electronic devices to meet the specific requirements and developments.

Furthermore, the joining bridging conductive metal facilitates electrical connection among the certain conductive terminals of the electrical connector, reducing signal crosstalk among certain conductive terminals of the electrical connector to enhance the transmission speed and quality of signal through the electrical connector. Additionally, this application eliminates the need for additional jumper adaptors to achieve electrical connection among the conductive terminals of the electrical connector, enabling electronic devices of the combined electrical connector disclosed in this application to continue evolving towards being lightweight, compact, and small.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A combined electrical connector, which is used with a joining element, comprising:

an outer shell component including an outer shell joining structure, and the outer shell joining structure can join to the joining element;

a joining component including a joining base, a joining insulation terminal frame, a joining bridging conductive metal, a joining major conductive terminal assembly, and a joining minor conductive terminal assembly; wherein the joining base includes a joining base plugging structure and a joining base crimping structure;

the joining major conductive terminal assembly includes a plurality of the joining major bridging conductive terminals and a joining major non-bridging conductive terminal, and the joining minor conductive terminal assembly includes a plurality of the joining minor bridging conductive terminals and a joining minor non-bridging conductive terminal;

the joining bridging conductive metal includes a joining conductive metal major abutting structure and a joining conductive metal minor abutting structure;

the joining insulation terminal frame includes a joining insulation terminal frame major connection structure and a joining insulation terminal frame minor connection structure, and the joining insulation terminal frame major connection structure and the joining insulation terminal frame minor connection structure are respectively connected to one side of the joining major conductive terminal assembly and the joining minor conductive terminal assembly, to respectively provide positioning for the joining major conductive terminal assembly and the joining minor conductive terminal assembly; wherein the joining base, the joining insulation terminal frame, the joining bridging conductive metal, the joining major conductive terminal assembly, and the joining minor conductive terminal assembly are assembled to form a joining component combination, in the joining component combination, the joining base plugging structure is inserted into the joining insulation terminal frame, and the joining base crimping structure is crimped onto the joining bridging conductive metal, thereby positioning the joining bridging conductive metal on the joining insulation terminal frame via the joining base, and the joining bridging conductive metal extends across the joining major non-bridging conductive terminal and the joining minor non-bridging conductive terminal, allowing the joining conductive metal major abutting structure to abut each of the joining major bridging conductive terminals, thereby electrically connecting each of the joining major bridging conductive terminals, and allowing the joining conductive metal minor abutting structure to abut each of the joining minor bridging conductive terminals, thereby electrically connecting each of the joining minor bridging conductive terminals; and the joining component is embedded within the outer shell component to form an electrical connector combination, in the electrical connector combination, the contact areas of the joining major conductive terminal assembly and the joining minor conductive terminal assembly are exposed on the outer shell joining structure, allowing the contact areas of the joining major conductive terminal assembly and the joining minor conductive terminal assembly to make electrical contact with the joining element when it the outer shell joining structure is joined to the joining element.

2. A combined electrical connector of claim 1, wherein the joining base plugging structure is further inserted into the joining bridging conductive metal to provide positioning for the joining bridging conductive metal.

3. A combined electrical connector of claim 1, wherein the joining insulation terminal frame further includes a joining insulation terminal frame connection structure, in the electrical connector combination, the joining insulation terminal frame connection structure is used to connect the outer shell component by means of snapping, fastening, or interference.

4. A combined electrical connector of claim 1, wherein the joining insulation terminal frame comprises a joining insulation terminal frame major element and a joining insulation terminal frame minor element, and the joining insulation terminal frame major connection structure is positioned on the joining insulation terminal frame major element, while the joining insulation terminal frame minor connection structure is positioned on the joining insulation terminal frame minor element, wherein the joining insulation terminal frame major element further includes a joining insulation terminal frame major assembly structure, and the joining insulation terminal frame minor element includes a joining insulation terminal frame minor assembly structure, wherein the joining insulation terminal frame major assembly structure and the joining insulation terminal frame minor assembly structure are structurally coordinated, allowing the joining insulation terminal frame major element and the joining insulation terminal frame minor element to combine and form a joining insulation terminal frame combination.

5. A combined electrical connector of claim 4, wherein the joining base further includes a joining base assembly structure, and the joining base assembly structure is respectively structurally coordinated with the joining insulation terminal frame major assembly structure and the joining insulation terminal frame minor assembly structure, allowing the joining base assembly structure is combined with the joining insulation terminal frame major element and the joining insulation terminal frame minor element to form the joining insulation terminal frame combination.

6. A combined electrical connector of claim 5, wherein the joining bridging conductive metal further includes a joining conductive metal assembly structure, and the joining base assembly structure is structurally coordinated with the joining conductive metal assembly structure, allowing the joining base assembly structure to combine with the joining bridging conductive metal, the joining insulation terminal frame major element, and the joining insulation terminal frame minor element to form the joining insulation terminal frame combination.

7. A combined electrical connector of claim 6, wherein the joining base assembly structure, the joining conductive metal assembly structure, the joining insulation terminal frame major assembly structure, and the joining insulation terminal frame minor assembly structure are protrusion and recess structure which are structurally coordinated.

8. A combined electrical connector of claim 5, wherein the joining base plugging structure includes a joining base plugging major substructure and a joining base plugging minor substructure, and the joining base plugging major substructure and the joining base plugging minor substructure are crossed arrangement and respectively insert into the joining insulation terminal frame major element and the joining insulation terminal frame minor element.

9. A combined electrical connector of claim 1, wherein the joining base includes a joining base separating wall, in the joining component combination, the joining base separating wall separates the joining major conductive terminal assembly from the joining minor conductive terminal assembly.

10. A combined electrical connector of claim 1, wherein the joining bridging conductive metal comprises a joining conductive metal major bridging element and a joining conductive metal minor bridging element, and the joining conductive metal major abutting structure and the joining conductive metal minor abutting structure are separately positioned on the joining conductive metal major bridging element and the joining conductive metal minor bridging element, wherein the joining base plugging structure is separately inserted into the joining conductive metal major bridging element and the joining conductive metal minor bridging element, respectively providing positioning for each of the joining conductive metal major bridging elements and the joining conductive metal minor bridging elements.

11. A combined electrical connector of claim 10, wherein the joining bridging conductive metal further comprises a joining conductive metal attaching structure, and the joining conductive metal attaching structure electrically attaches the joining conductive metal major bridging element and the joining conductive metal minor bridging element separately, allowing each of the joining major bridging conductive terminals and each of the joining minor bridging conductive terminals to be electrically connected.

12. A combined electrical connector of claim 1, wherein the joining base is insulation base or conductive plastic base.

13. A combined electrical connector of claim 1, wherein the outer shell joining structure is an embedding structure, and the contact areas of the joining major conductive terminal assembly and the joining minor conductive terminal assembly are exposed on the side wall surface of the embedding structure.

* * * * *